United States Patent
Ueda et al.

(10) Patent No.: US 6,725,827 B2
(45) Date of Patent: Apr. 27, 2004

(54) SPARK INGITION STRATIFIED COMBUSTION INTERNAL COMBUSTION ENGINE

(75) Inventors: Takanori Ueda, Susono (JP); Takeshi Okumura, Susono (JP); Shigeo Furuno, Fuji (JP); Satoshi Iguchi, Mishima (JP); Kazuhiro Akihama, Aichi (JP); Masahiro Taki, Aichi (JP); Satoshi Yamazaki, Aichi (JP)

(73) Assignees: Toyota Jidosha Kabushiki Kaisha, Toyota (JP); Kabushiki Kaisha Toyota Chuo Kenkyusho, Aichi-gun (JP)

( * ) Notice: Subject to any disclaimer, the term of this patent is extended or adjusted under 35 U.S.C. 154(b) by 12 days.

(21) Appl. No.: 10/220,727
(22) PCT Filed: Mar. 8, 2001
(86) PCT No.: PCT/JP01/01835
§ 371 (c)(1), (2), (4) Date: Oct. 3, 2002
(87) PCT Pub. No.: WO01/66938
PCT Pub. Date: Sep. 13, 2001

(65) Prior Publication Data
US 2003/0089331 A1 May 15, 2003

(30) Foreign Application Priority Data
Mar. 8, 2000 (JP) .......................................... 2000-068667

(51) Int. Cl.$^7$ ............................................... F02B 17/00
(52) U.S. Cl. ...................... 123/295; 123/298; 123/365; 123/431
(58) Field of Search ............................. 123/295, 298, 123/305, 431

(56) References Cited

U.S. PATENT DOCUMENTS

| 6,293,246 | B1 | | 9/2001 | Tanahashi et al. |
| 6,341,487 | B1 | * | 1/2002 | Takahashi et al. ........... 123/431 |
| 6,354,264 | B1 | * | 3/2002 | Iwakiri et al. ............... 123/305 |
| 6,390,057 | B2 | * | 5/2002 | Yoshizawa et al. ......... 123/295 |
| 6,394,064 | B1 | * | 5/2002 | Nieberding ................. 123/295 |
| 6,659,071 | B2 | * | 12/2003 | LaPointe et al. ............ 123/305 |
| 2002/0007816 | A1 | * | 1/2002 | Zur Loye et al. ........... 123/295 |

FOREIGN PATENT DOCUMENTS

| JP | U 2-141648 | 11/1990 |
| JP | A 10-68341 | 3/1998 |
| JP | A 2000-179368 | 6/2000 |
| JP | A 2001-123925 | 5/2001 |

* cited by examiner

Primary Examiner—Erick Solis
(74) Attorney, Agent, or Firm—Oliff & Berridge, PLC

(57) ABSTRACT

A fuel injector (6) and spark plug (7) are arranged in a combustion chamber (5) of an internal combustion engine. By forming by stratification a self-ignitable preliminary air-fuel mixture in the combustion chamber (5), a spatial distribution is given to the density of the preliminary air-fuel mixture in the combustion chamber (5). Part of the preliminary air-fuel mixture formed in the combustion chamber (5) is ignited by the spark plug (7) to cause combustion by flame propagation, then the remaining preliminary air-fuel mixture is successively made to self-ignite and burn with a time lag. The ignition timing is set so that the ratio of the preliminary air-fuel mixture made to burn by self-ignition becomes more than a predetermined lower limit and less than a knocking generation limit.

17 Claims, 19 Drawing Sheets

Fig.5
(A)
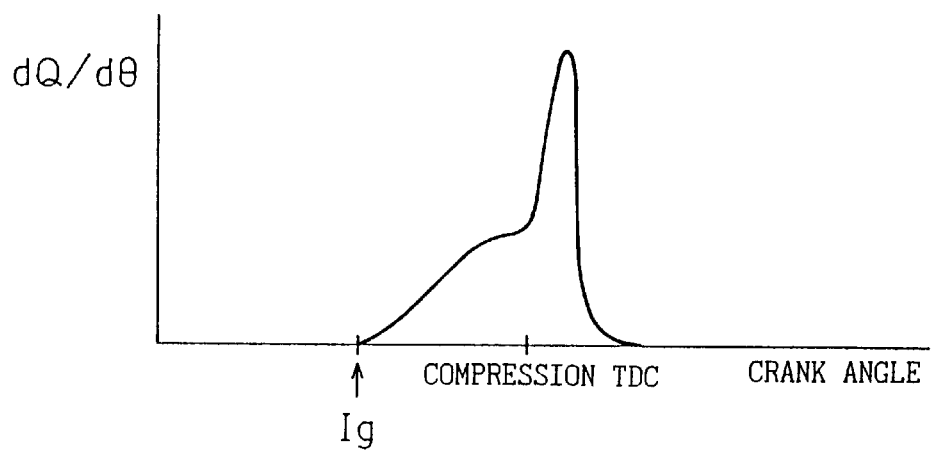
(B)
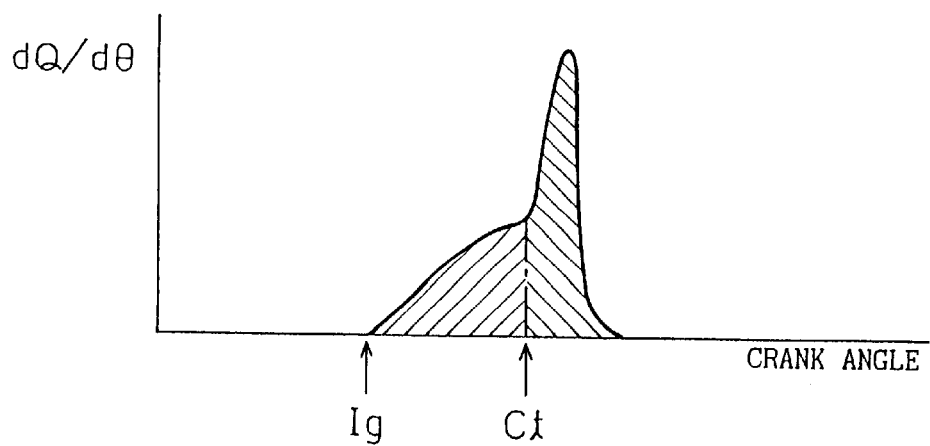

Fig.7
(A)
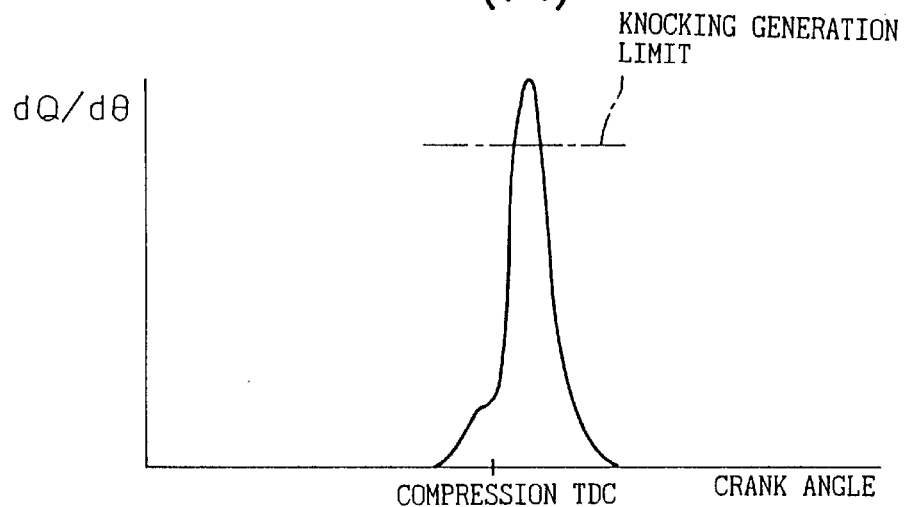
(B)
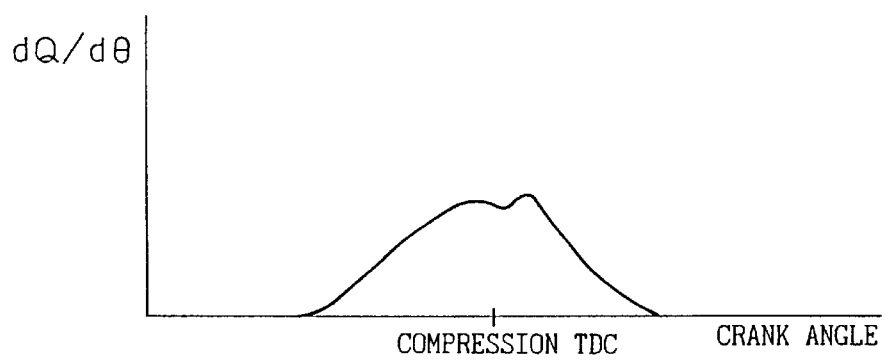

Fig.8
(A)
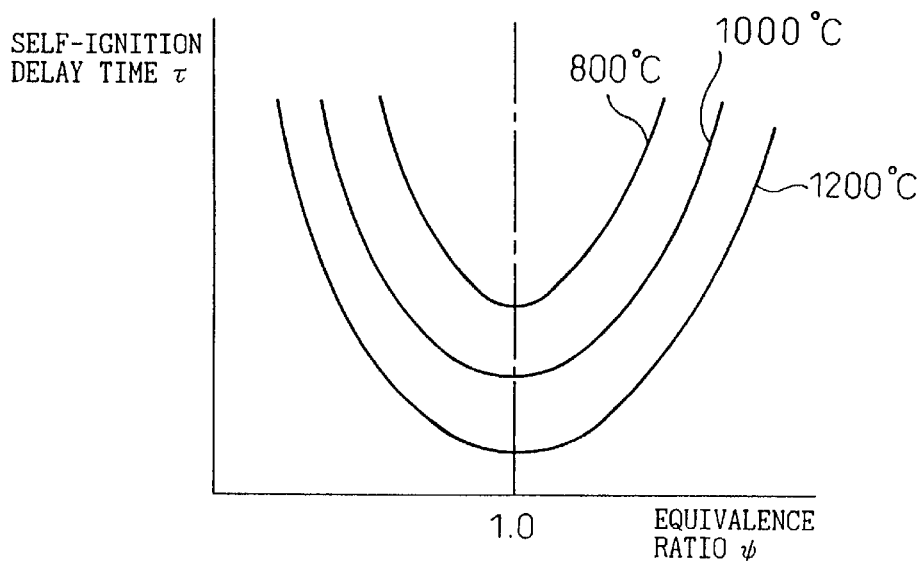
(B)
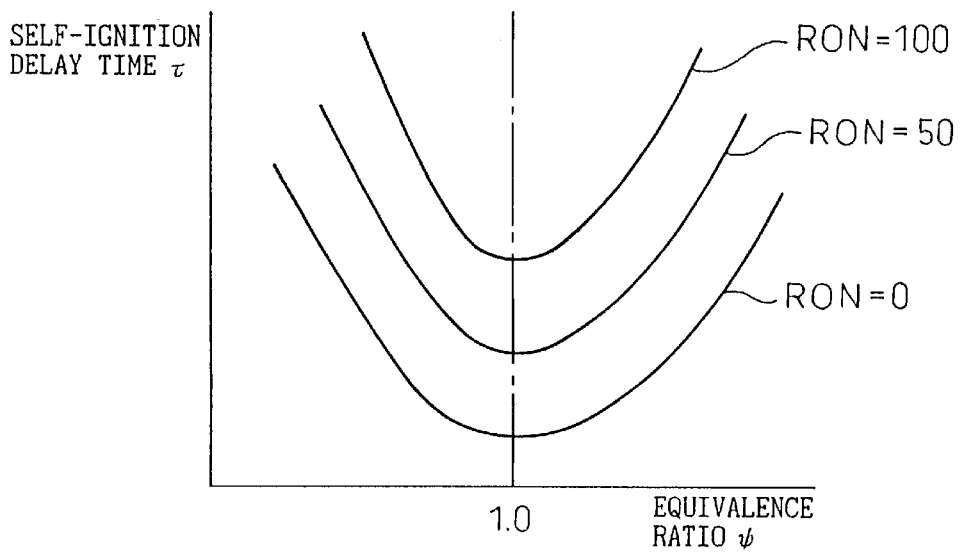

SPARK INGITION STRATIFIED COMBUSTION INTERNAL COMBUSTION ENGINE

TECHNICAL FIELD

The present invention relates to a spark ignition type stratified charge combustion internal combustion engine.

BACKGROUND ART

When injecting fuel in a diesel engine, part of the fuel immediately evaporates and forms a preliminary air-fuel mixture while the remaining fuel is made to diffuse in a combustion chamber in the form of fuel droplets. Next, the preliminary air-fuel mixture is made to self-ignite. This forms a heat source for successive combustion of the fuel vaporizing from the fuel droplets. That is, diffusion combustion is performed. In this case, if the ratio of the preliminary air-fuel mixture becomes too great, explosive combustion will occur, so the combustion temperature will sharply rise and therefore a large amount of $NO_x$ will be produced.

Therefore, known in the art is a diesel engine designed so that a combustion pressure sensor and spark plug are arranged in the combustion chamber, the ratio of the preliminary air-fuel mixture is found from the detected combustion pressure, when the ratio of the preliminary air-fuel mixture becomes greater than an optimum value, the spark timing is advanced to cause the spark plug to make the preliminary air-fuel mixture ignite before the amount of generation of the preliminary air-fuel mixture increases excessively, and when the ratio of the preliminary air-fuel mixture at the time of ignition by the spark plug becomes smaller than the optimum value, the spark timing is delayed to make the preliminary air-fuel mixture ignite by the spark plug when the amount of generation of the preliminary air-fuel mixture increases to a suitable amount (see Japanese Unexamined Utility Model Publication (Kokai) No. 2-141648).

On the other hand, in a spark ignition type internal combustion engine as well, when the pressure and temperature in the combustion chamber become extremely high, self-ignition occurs. If self-ignition occurs in a spark ignition type internal combustion engine, however, the entire preliminary air-fuel mixture will burn all at once, so the pressure and temperature in the combustion chamber will rapidly rise and as a result not only will knocking occur, but also a large amount of $NO_x$ will be produced. Therefore, in the past, spark ignition type internal combustion engines have been designed as much as possible so as not to allow self-ignition and so that the air-fuel mixture is made to burn by the flame of ignition by a spark plug.

If self-ignition occurs, however, as explained above, knocking occurs and a large amount of $NO_x$ will be produced. Combustion by self-ignition, however, is completed in a short time. Therefore, if combustion by self-ignition is caused, the thermal efficiency rises. Therefore, if it were possible to cause combustion by self-ignition without causing knocking and the production of a large amount of $NO_x$, a practical internal combustion engine with a high thermal efficiency could be obtained.

Whether or not knocking and production of a large amount of $NO_x$ are caused when combustion by self-ignition occurs, however, depends on the amount of the preliminary air-fuel mixture able to be burned by self-ignition and the combustion time. That is, if the entire preliminary air-fuel mixture is burned all at once, as explained above, knocking and production of a large amount of $NO_x$ will occur. If however not all of the preliminary air-fuel mixture, but only part of the preliminary air-fuel mixture is made to burn by self-ignition and the preliminary air-fuel mixture is made to burn by self-ignition little by little with a time lag, the pressure and temperature in the combustion chamber will not rise that much and therefore knocking and production of a large amount of $NO_x$ will no longer occur. If the amount of the preliminary air-fuel mixture burned by self-ignition in this case is too small, however, no improvement in the thermal efficiency can be expected. Therefore, there is a lower limit to the amount of the preliminary air-fuel mixture which should be made to be burned by self-ignition.

That is, to improve the thermal efficiency while preventing knocking and production of a large amount of $NO_x$, it is necessary to maintain the ratio of the preliminary air-fuel mixture burned by self-ignition in an optimum range and ensure that the preliminary air-fuel mixture burns successively by self-ignition with a time lag.

DISCLOSURE OF INVENTION

An object of the present invention is to provide a spark ignition type stratified charge combustion internal combustion engine causing part of the preliminary air-fuel mixture to burn by self-ignition and thereby improving the thermal efficiency, reducing torque fluctuation, and enabling a reduction in the amount of production of unburnt hydrocarbons.

According to the present invention, there is provided a spark ignition type stratified charge combustion internal combustion engine arranging a spark plug in a combustion chamber, said spark ignition type stratified charge combustion internal combustion engine forming by stratification a self-ignitable preliminary air-fuel mixture in the combustion chamber to give a spatial distribution to the density of the preliminary air-fuel mixture in the combustion chamber, igniting part of the preliminary air-fuel mixture formed in the combustion chamber by the spark plug to cause combustion by flame propagation, then successively making the remaining preliminary air-fuel mixture burn by self-ignition with a time lag, and setting the ignition timing so that the ratio of the preliminary air-fuel mixture made to burn by self-ignition becomes more than a predetermined lower limit and less than a knocking generation limit.

BRIEF DESCRIPTION OF DRAWINGS

FIGS. 5(A)–7(B) are views of a heat release rate dQ/dθ, FIGS. 8(A)–8(B) are schematic views of a self-ignition delay time.

BEST MODE FOR CARRYING OUT THE INVENTION

Figure 1:
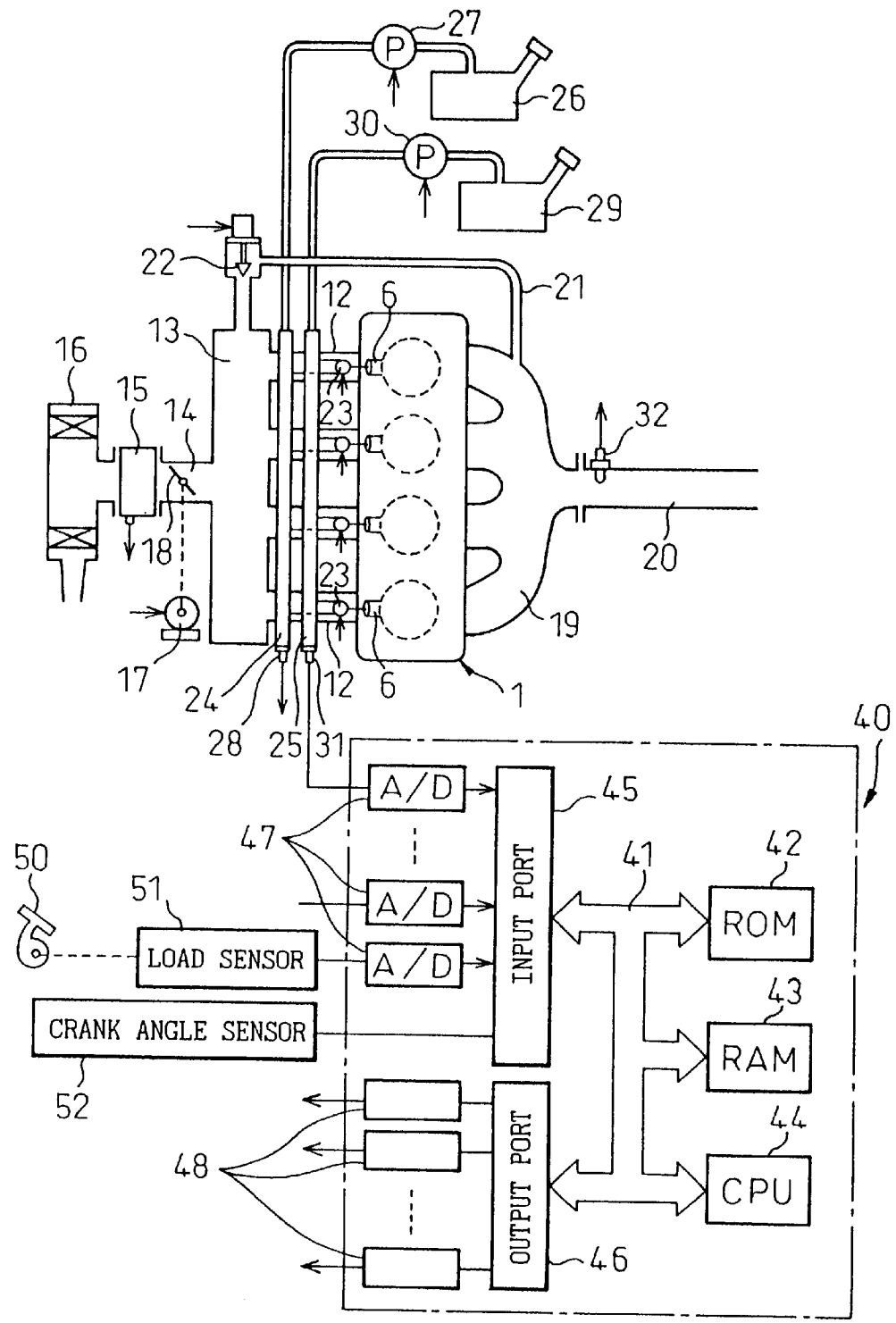
FIG. 1 is an overview of an internal combustion engine.
Figure 2:
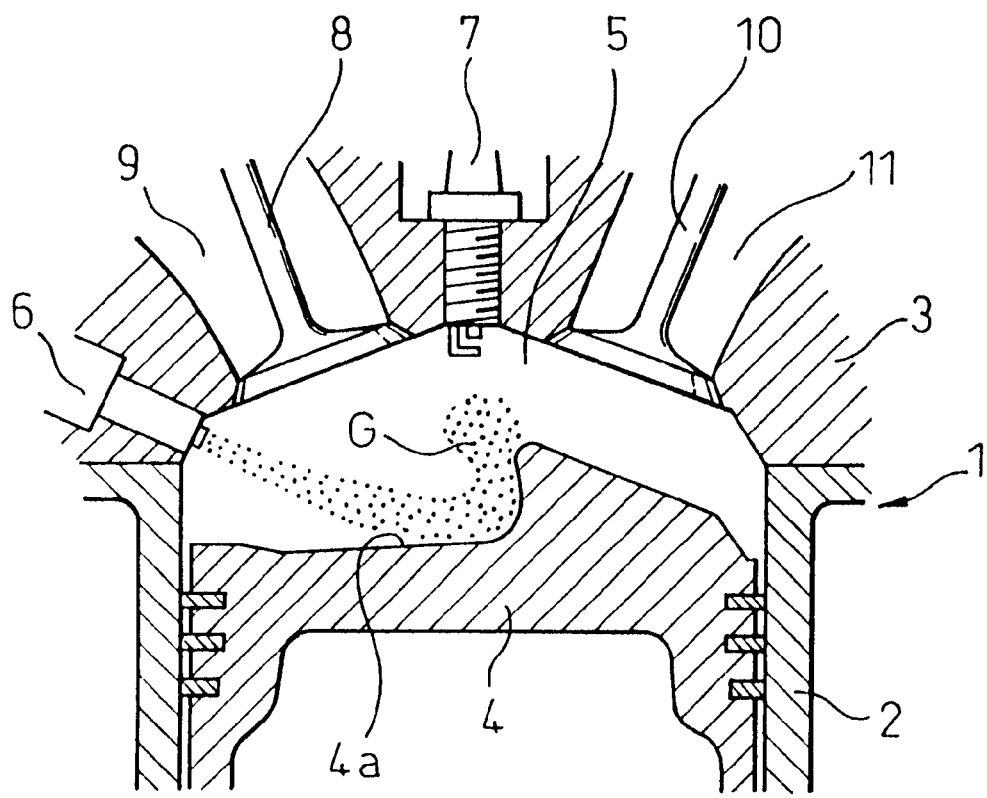
FIG. 2 is a side sectional view of a combustion chamber.

FIG. 1 and FIG. 2 show the case of application of the present invention to a stratified charge combustion internal combustion engine.

Referring to FIG. 1, an engine block 1 is provided with four cylinders. FIG. 2 is a side sectional view of these cylinders. Referring to FIG. 2, 2 indicates a cylinder block, 3 a cylinder head, 4 a piston, 5 a combustion chamber, 6 a fuel injector arranged at the periphery of an inner wall surface of the cylinder head 3, 7 a spark plug arranged at a center of the inner wall surface of the cylinder head 3, 8 an intake valve, 9 an intake port, 10 an exhaust valve, and 11 an exhaust port.

Referring to FIG. 1 and FIG. 2, the intake port 9 is connected to a surge tank 13 through a corresponding intake tube 12, while the surge tank 13 is connected to an air cleaner 16 through an intake duct 14 and an air flow meter 15. Inside the intake duct 14 is arranged a throttle valve 18 driven by a step motor 17. On the other hand, the exhaust port 11 of each cylinder is connected to an exhaust pipe 20 through an exhaust manifold 19. Further, the exhaust manifold 19 and surge tank 13 are connected with each other through an exhaust gas recirculation (hereinafter referred to as "EGR") passage 21. Inside the EGR passage 21 is arranged an electrically controlled EGR control valve 22.

Each fuel injector 6 is connected with a corresponding fuel supply control valve 23. Each fuel supply control valve 23 is connected to a pair of fuel reservoirs, so-called "common rails" 24 and 25. Inside the common rail 24, low octane fuel of a fuel tank 26 is supplied through an electrically controlled variable discharge fuel pump 27. The low octane fuel supplied into the common rail 24 is supplied to the fuel supply control values 23. The common rail 24 has attached to it a fuel pressure sensor 28 for detecting the fuel pressure in the common rail 24. Based on the output signal of the fuel pressure sensor 28, the amount of discharge of the fuel pump 27 is controlled so that the fuel pressure in the common rail 24 becomes a target fuel pressure.

On the other hand, high octane fuel in the fuel tank 29 is supplied into the common rail 25 through an electrically controlled variable discharge fuel pump 30. The high octane fuel supplied into the common rail 25 is supplied to each fuel supply control valve 23. The common rail 25 has attached to it a fuel pressure sensor 31 for detecting the fuel pressure in the common rail 25. The amount of discharge of the fuel pump 30 is controlled based on the output signal of the fuel pressure sensor 31 so that the fuel pressure in the common rail 25 becomes the target fuel pressure.

Each fuel supply control valve 23 has the function of selectively supplying one of the low octane fuel and high octane fuel to the corresponding fuel injector 6 and the function of mixing the low octane fuel and high octane fuel in accordance with a required mixing ratio and supplying the mixed fuel to the corresponding fuel injector 6.

An electronic control unit 40 is comprised of a digital computer and is provided with a ROM (read only memory) 42, RAM (random access memory) 43, CPU (microprocessor) 44, input port 45, and output port 46 connected with each other by a bidirectional bus 41. The air flow meter 15 generates an output voltage proportional to the amount of intake air. The output voltage is input to the input port 45 through a corresponding AD converter 47. The exhaust pipe 20 has an air-fuel ratio sensor 32 attached to it. The output voltage of the air-fuel ratio sensor 32 is input to the input port 45 through a corresponding AD converter 47. Further, the input port 45 receives as input the output signals of the fuel pressure sensors 28 and 31 through the corresponding AD converters 47.

Further, an accelerator pedal 50 has connected to it a load sensor 51 generating an output voltage proportional to the amount of depression L of the accelerator pedal 50. The output voltage of the load sensor 51 is input to the input port 45 through a corresponding AD converter 47. Further, the input port 45 has connected to it a crank angle sensor 52 generating an output pulse each time a crankshaft rotates for example by 30°. On the other hand, the output port 46 has connected to it through a corresponding drive circuit 48 the fuel injectors 6, spark plugs 7, throttle valve control step motor 17, EGR control valve 22, fuel supply control valves 23, and fuel pumps 27 and 30.

Figure 3:
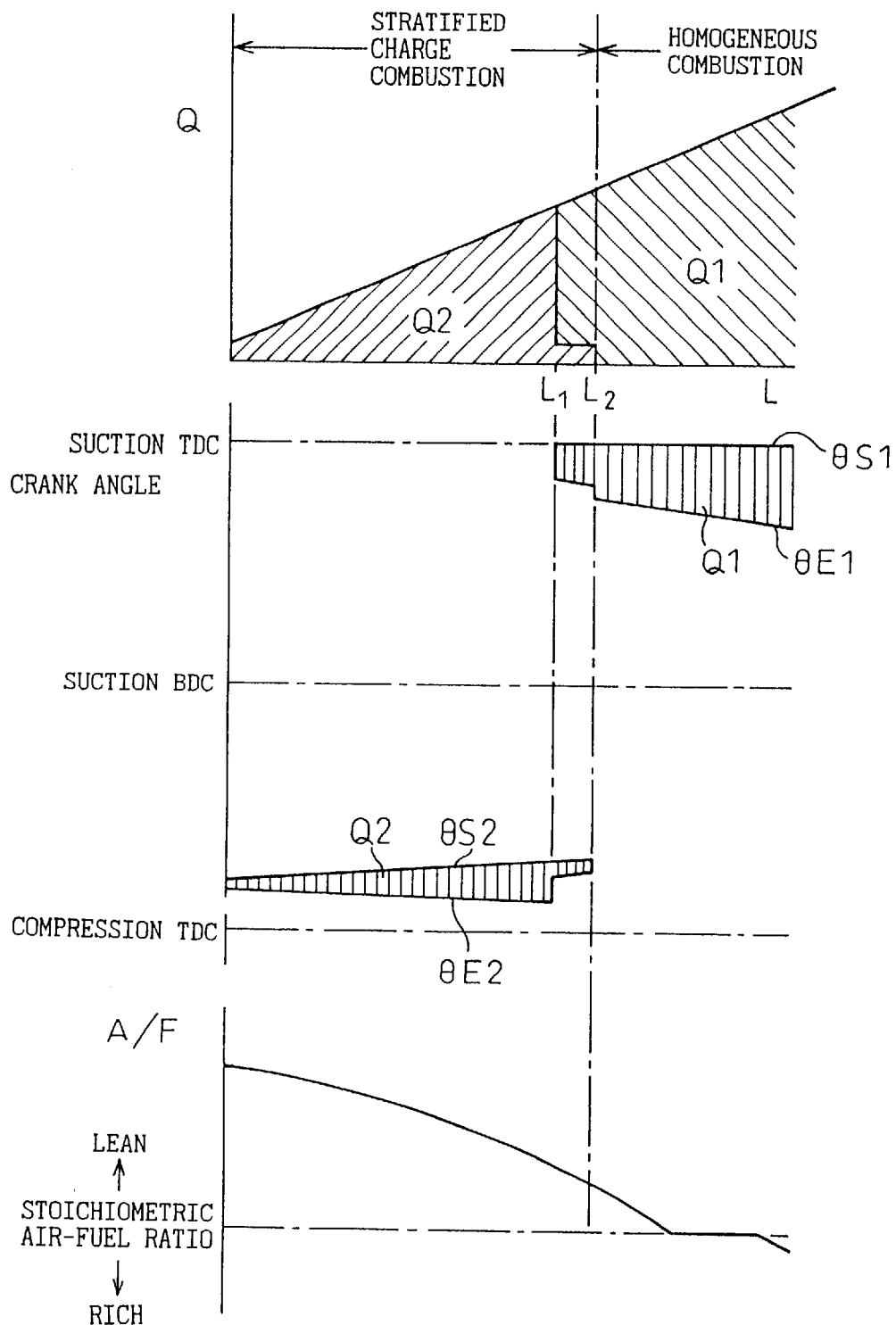
FIG. 3 is a view of an injection amount, injection timing, and air-fuel ratio.

FIG. 3 shows the fuel injection amounts Q1, Q2, Q(=$Q_1$+$Q_2$), injection start timings θS1, θS2, injection end timings θE1, θE2, and average air-fuel ratio A/F in a combustion chamber 5. Note that in FIG. 3, the abscissa L indicates the required torque.

As will be understood from FIG. 3, when the required torque L is lower than $L_1$, fuel injection Q2 is performed from θS2 to θE2 in the end period of the compression stroke. At this time, the average air-fuel ratio A/F is considerably lean. When the required torque is between $L_1$ and $L_2$, the first fuel injection Q1 is performed from θS1 to θE1 of the initial period of the suction stroke, then the second fuel injection Q2 is performed from θS2 to θE2 of the end period of the compression stroke. At this time as well, the air-fuel ratio A/F is lean. When the required torque L is larger than $L_2$, fuel injection Q1 is performed from θS1 to θE1 of the initial period of the suction stroke. At this time, in the region of the low required load L, the average air-fuel ratio A/F is made the stoichiometric air-fuel ratio. When the required torque L becomes further higher, the average air-fuel ratio A/F is made rich.

FIG. 2 shows the case where fuel injection Q2 is performed when the required torque L is smaller than $L_1$ (FIG. 3), that is, only at the end period of the compression stroke. As shown in FIG. 2, a cavity 4a is formed in the top face of the piston 4. When the required torque L is lower than $L_1$, fuel is injected from the fuel injector 6 toward the bottom surface of the cavity 4a in the end period of the compression stroke. This fuel is guided by the peripheral wall surface of the cavity 4a and heads toward the spark plug 7, whereby a preliminary air-fuel mixture G is formed around the spark plug 7. Next, the preliminary air-fuel mixture G is ignited by the spark plug 7. That is, at this time, stratified charge combustion is performed.

On the other hand, as explained above, when the required torque L is between $L_1$ and $L_2$, the fuel is injected divided into two parts. In this case, a lean air-fuel mixture is formed in the combustion chamber 5 by the first fuel injection Q1 performed at the initial period of the suction stroke. Next, an optimum density preliminary air-fuel mixture is formed around the spark plug 7 by the second fuel injection Q2 performed at the end period of the compression stroke. This preliminary air-fuel mixture is ignited by the spark plug 7. The lean air-fuel mixture is made to burn by the flame of ignition. Therefore, at this time as well, stratified charge combustion is performed.

On the other hand, when the required torque is higher than $L_2$, as shown in FIG. 3, a lean, stoichiometric air-fuel ratio, or rich air-fuel ratio homogeneous air-fuel mixture is formed in the combustion chamber 5. This homogeneous air-fuel mixture is ignited by the spark plug 7. That is, at this time, homogeneous combustion is performed.

Figure 4:
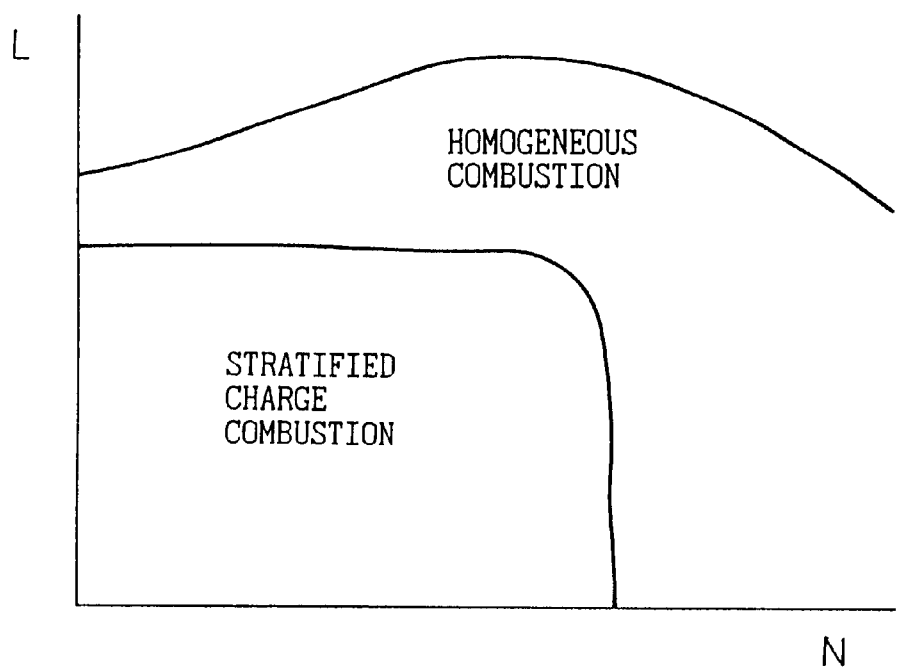
FIG. 4 is a view of operating regions of stratified charge combustion and homogeneous combustion.

Note that the operating region where stratified charge combustion is performed and the operating region where homogeneous combustion is performed are not determined by just the required torque L. In actuality, as shown in FIG. 4, they are determined by the required torque L and the engine speed N.

Next, the self-ignition combustion method according to the present invention will be explained. In a first embodiment according to the present invention, the fuel injection timing and the ignition timing are set so that, when in the operating region where stratified charge combustion is performed, low octane fuel is injected from the fuel injector 6, part of the preliminary air-fuel mixture formed in the combustion chamber 5 is ignited by the spark plug 7 and combustion by flame propagation occurs at that time, then the remaining preliminary air-fuel mixture is made to burn by self-ignition.

Note that the term "low octane fuel" in the present invention indicates fuel of an octane value lower than the lower limit 89 of the octane value of regular gasoline (No. 2) according to the specifications of JIS K 2202, while the term "high octane fuel" in the present invention indicates fuel of at least an octane value 89 according to the specifications of JIS K 2202 and for example indicates premium gasoline (No. 1) and regular gasoline (No. 2). Further, in the embodiments of the present invention explained later, when referring to "low octane fuel", this means fuel of an octane value of not more than 50 unless specially alluded to.

FIG. 5(A) shows the heat release rate $dQ/d\theta$ at the time of combustion by self-ignition by the method according to the present invention. Note that in FIG. 5(A), Ig indicates the ignition timing. As shown in FIG. 5(A), when ignition occurs by the spark plug 7 at Ig, the heat release rate $dQ/d\theta$ rises relatively gently up until close to top dead center TDC of the compression stroke. During this time, the preliminary air-fuel mixture comprised of the low octane fuel ignited by the spark plug 7 burns by flame propagation. Next, when close to top dead center TDC of the compression stroke, the heat release rate $dQ/d\theta$ rapidly rises, then rapidly falls. During this time, the preliminary air-fuel mixture comprised of the low octane fuel burns by self-ignition. That is, the time when the heat release rate $dQ/d\theta$ starts to rapidly rise is the time for shifting from combustion by flame propagation to combustion by self-ignition.

Therefore, below, the ratio by mass of the preliminary air-fuel mixture made to burn from the ignition time Iq to the point of time Ct when the heat release rate $dQ/d\theta$ starts to rapidly rise in FIG. 5(B) is called the "flame-propagation combustion ratio", while the ratio by mass of the preliminary air-fuel mixture made to burn by self-ignition after Ct is called the "self-ignition combustion ratio".

Figure 6:
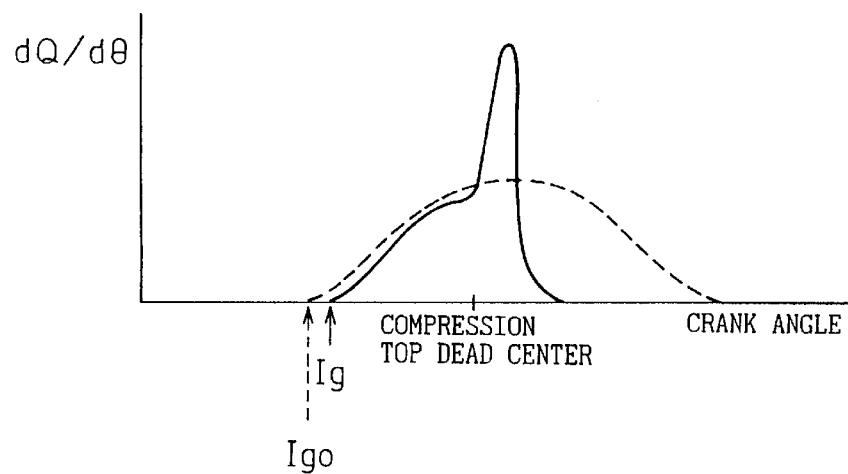

In FIG. 6, the solid line shows the change in the heat release rate $dQ/d\theta$ in the case of causing combustion by flame propagation of part of the preliminary air-fuel mixture, then causing combustion by self-ignition of the remaining preliminary air-fuel mixture. In FIG. 6, the broken line shows the case of causing combustion by flame propagation of the entire preliminary air-fuel mixture. As shown in FIG. 6, if part of the preliminary air-fuel mixture is made to burn by self-ignition, the heat release rate $dQ/d\theta$ rapidly falls after top dead center TDC of the compression stroke and the combustion is rapidly completed compared with the case of making all of the preliminary air-fuel mixture burn by flame propagation.

It takes time for flame to propagate. The leaner the preliminary air-fuel mixture becomes, the slower the speed of propagation of the flame. Therefore, when causing all of the preliminary air-fuel mixture to burn by flame propagation, as shown by the broken line in FIG. 6, when the preliminary air-fuel mixture is particularly lean, the combustion time becomes long. If the combustion time becomes long, the engine output falls, so not only does the amount of fuel consumption increase, but also torque fluctuation occurs since the combustion in the end period of combustion becomes particularly unstable. Further, if the fuel dispersed to the periphery of the combustion chamber 5 is too lean, flame will not propagate there, therefore a large amount of unburned hydrocarbons will be produced. This means that amount of fuel consumption will be further increased and the fuel economy will deteriorate.

As shown by the solid line in FIG. 6, however, if the combustion is rapidly completed, the engine output will improve, so the amount of fuel consumption will decrease. Further, since the combustion is stable, the amount of torque fluctuation will become extremely small. Further, even when the preliminary air-fuel mixture is lean, combustion by self-ignition combustion. If the preliminary air-fuel mixture, which should be made to burn in the latter phase of combustion if combustion by self-ignition does not occur, burns by self-ignition, it will be burned in an extremely short time, so the amount of unburned hydrocarbons produced will become extremely small. If combustion by self-ignition occurs in this way, there are the major advantages that the engine output will increase and the amount of fuel consumption will decrease, that is, the thermal efficiency will improve, and, further, the torque fluctuation will decrease and the amount of production of unburned hydrocarbons will become extremely small.

In this way, combustion by self-ignition has great advantages, but if violent combustion by self-ignition is caused, as shown in FIG. 7(A), the peak of the heat release rate $dQ/d\theta$ will become greater and the knocking generation limit will end up being exceeded and therefore knocking will occur. Therefore, even if combustion by self-ignition is caused, it is necessary to keep the peak of the heat release rate $dQ/d\theta$ from exceeding the knocking generation limit. In this case, whether or not the peak of the heat release rate $dQ/d\theta$ will exceed the knocking generation limit is determined by both the self-ignition combustion ratio of the preliminary air-fuel mixture and the degree of stratification of the preliminary air-fuel mixture. In particular, the effect of the degree of stratification of the preliminary air-fuel mixture is extremely great.

That is, if the fuel molecules are heated, hydroxide radicals and other radicals are gradually produced. If the amount of these radicals exceeds a certain amount, combustion by self-ignition will occurs. If the amount of radicals produced is small, time will be taken until self-ignition occurs. In this way, a time lag occurs in the occurrence of self-ignition in accordance with the amount of generation of radicals. Therefore, the time from when heat decomposition of the fuel molecules starts to when self-ignition occurs will be called the "self-ignition delay time".

FIG. 8(A) is a schematic view of the relationship between the self-ignition delay time τ and the equivalence ratio ψ of the preliminary air-fuel mixture for various temperatures 800° C., 1000° C., 1200° C. in the combustion chamber 5, and FIG. 8(B) is a schematic view of the relationship between the self-ignition delay time τ and the equivalence ratio ψ of the preliminary air-fuel mixture for various octane values 0, 50, and 100 of the injected fuel. From FIGS. 8(A) and (B), when the equivalence ratio ψ is 1.0, that is, when the ratio of the air and fuel becomes the stoichiometric air-fuel ratio, the self-ignition delay time τ becomes the shortest. Both if the equivalence ratio ψ becomes small, that is, air becomes in excess, and if the equivalence ratio ψ becomes large, that is, fuel becomes in excess, the self-ignition delay time τ becomes long. That is, if the air becomes in excess, extra heat is used for warming the excess air, while if fuel becomes in excess, extra heat is used for warming the excess fuel. Therefore, the further the equivalence ratio ψ from 1.0, the longer the self-ignition delay time τ.

On the other hand, the higher the temperature around the fuel molecules, the greater the amount of radicals produced. Therefore, as shown in FIG. 8(A), the higher the temperature in the combustion chamber 5, the shorter the self-ignition delay time τ. Further, the smaller the octane value RON of the fuel, the greater the amount of radicals produced. Therefore, the smaller the octane value RON of the fuel, the shorter the self-ignition delay time τ.

Now, when a homogeneous preliminary air-fuel mixture is formed in the combustion chamber 5, the preliminary air-fuel mixture becomes equal in equivalence ratio ψ everywhere. Therefore, the preliminary air-fuel mixture becomes completely equal in self-ignition delay time τ everywhere. If however the self-ignition delay time τ becomes completely equal everywhere in the preliminary air-fuel mixture, when the pressure and temperature in the combustion chamber 5 rise, all of the preliminary air-fuel mixture will be burned by self-ignition all at once. If all of the preliminary air-fuel mixture is burned by self-ignition all at once, however, leaving aside the case where the amount of the preliminary air-fuel mixture is extremely small, the pressure in the combustion chamber 5 will rapidly rise and therefore knocking will occur.

Figure 9:
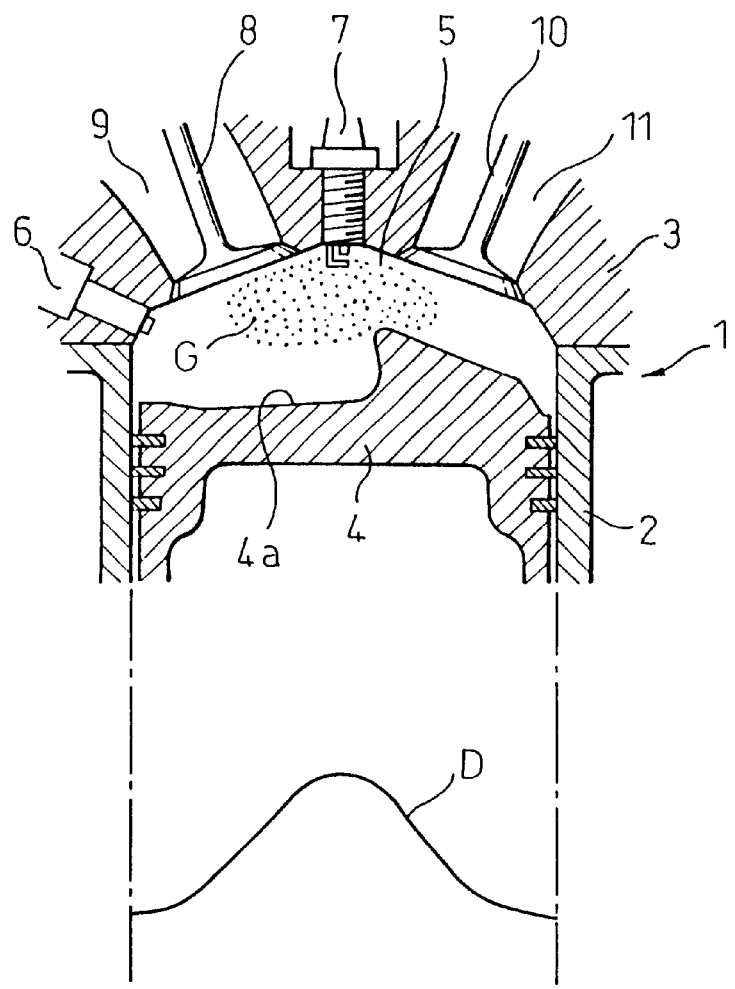
FIG. 9 is a view of a density distribution of a preliminary air-fuel mixture in the combustion chamber.

As opposed to this, in the present invention, when stratified charge combustion is being performed, as shown in FIG. 9, a flammable air-fuel mixture G is formed around the spark plug 7. In the example shown in FIG. 9, the density D of the preliminary air-fuel mixture in the combustion chamber 5 becomes highest at the center of the combustion chamber 5 as shown by the curve D in FIG. 9 and gradually falls toward the periphery of the combustion chamber 5. That is, a spatial distribution is caused in the density D of the preliminary air-fuel mixture. In this case, if assuming that a preliminary air-fuel mixture having an equivalence ratio ψ of about 1 is formed around the spark plug 7, the equivalence ratio ψ of the preliminary air-fuel mixture gradually becomes smaller toward the periphery of the combustion chamber 5.

If the equivalence ratio ψ of the preliminary air-fuel mixture becomes gradually smaller in this way, as will be understood from FIGS. 8(A) and (B), the ignition delay time τ will gradually become longer. Therefore, if the preliminary air-fuel mixture at the center of the combustion chamber 5 self-ignites, the preliminary air-fuel mixture around it will self-ignite with a time lag and therefore the preliminary air-fuel mixture will successively self-ignite from the center of the combustion chamber 5 to the periphery with a time lag. If the preliminary air-fuel mixture successively self-ignites with a time lag in this way, the rise in pressure inside the combustion chamber 5 will become gentle, so knocking will become harder to occur. That is, to cause combustion by self-ignition and prevent the occurrence of knocking, stratification of the preliminary air-fuel mixture becomes an essential requirement. In this case, knocking becomes harder to occur the greater the degree of stratification, that is, the difference in density in the preliminary air-fuel mixture dispersed in the combustion chamber 5.

Note that in this case, what is important is to give a spatial distribution to the density D of the preliminary air-fuel mixture. Therefore, in so far as a spatial distribution is caused in the density D of the preliminary air-fuel mixture, there is no need to make the density D of the preliminary air-fuel mixture around the spark plug 7 the highest. Further, there is no need to make the equivalence ratio ψ of the preliminary air-fuel mixture with the highest density D 1.

On the other hand, even if making the difference in density of the preliminary air-fuel mixture large, if the absolute amount of the preliminary air-fuel mixture made to burn by self-ignition becomes greater, knocking will easily occur. Therefore, as explained above, whether the heat release rate dQ/dθ will exceed the knocking generation limit as shown in FIG. 7(A) is determined by both of the self-ignition combustion ratio of the preliminary air-fuel mixture and the degree of stratification of the preliminary air-fuel mixture.

On the other hand, if the self-ignition combustion ratio is made small, as shown in FIG. 7(B), the heat release rate dQ/dθ is made to gradually fall after top dead center TDC of the compression stroke. That is, the combustion time becomes longer. If the combustion time becomes longer, in the same way as when making all of the preliminary air-fuel mixture burn by flame propagation, the thermal efficiency will fall, the torque fluctuation will become larger, and a large amount of unburned hydrocarbons will be produced. In this case, to improve the thermal efficiency, reduce the torque fluctuation, and reduce the amount of production of unburned hydrocarbons, it has been confirmed by experiments that it is necessary to make the self-ignition combustion ratio of the preliminary air-fuel mixture at least about 20 percent.

Therefore, in the present invention, the self-ignition combustion ratio of the preliminary air-fuel mixture is controlled to be in the range of at least about 20 percent and where no knocking will occur. In this case, if the combustion by flame propagation is increased, the self-ignition combustion ratio will decrease. The flame-propagation combustion ratio becomes larger the earlier the ignition timing Ig (FIG. 5(A)). Therefore, the self-ignition combustion ratio can be controlled by the ignition timing Ig.

On the other hand, if seen from the viewpoint of the thermal efficiency, combustion by self-ignition preferably is started near top dead center TDC of the compression stroke, more specifically, from about 5° before top dead center BTDC of the compression stroke to about 5° after top dead center ATDC of the compression stroke. Therefore, in this embodiment of the present invention, the ignition timing Tg is set so that combustion by self-ignition is started between about BTDC 5° and about ATDC 5° and the self-ignition combustion ratio becomes a self-ignition combustion ratio of at least about 20 percent and where knocking will not occur. This ignition timing IG changes according to the required torque and the engine speed. In this embodiment of the present invention, the optimum value of this ignition timing Ig is found in advance from experiments.

Note that the reason why self-ignition combustion results in an improvement of the thermal efficiency, a smaller torque fluctuation, and a reduced amount of production of unburned hydrocarbons is that the combustion is rapidly completed due to the combustion by self-ignition. There is almost no dependency on the absolute amount of the preliminary air-fuel mixture made to burn by self-ignition. Therefore, there is no need for the self-ignition combustion ratio to be made that great. For example, it is possible to maintain the self-ignition combustion ratio of the preliminary air-fuel mixture between 20 percent to 30 percent or so without regard to the required torque and the engine speed.

Further, if high octane fuel is used, under the same temperature and same pressure, self-ignition would be difficult, so in the present invention, low octane fuel is used when combustion by self-ignition should be performed. Due to differences in the engine compression ratio etc., there are engines of a type where self-ignition will occur when using low octane fuel even without a spark and engines of a type where self-ignition will not occur without a spark. In an engine of a type where self-ignition will not occur without a spark, combustion by self-ignition occurs induced by the rise in pressure and temperature in the combustion chamber due to combustion by flame propagation. It is possible to use engines of either type, but in this embodiment of the present invention, an engine of a type where self-ignition will not occur without a spark is used.

To cause combustion by self-ignition without the occurrence of knocking, it is necessary to stratify the preliminary air-fuel mixture as explained above. Therefore, when using an engine enabling stratified charge combustion regardless of the required torque and engine speed, it is possible to cause combustion by self-ignition after combustion by flame propagation across the entire operating region.

In this embodiment of the present invention, as shown in FIG. 3 and FIG. 4, in the region of a high required torque L and engine speed N, homogeneous combustion is performed. When homogeneous combustion is performed, if a low octane fuel is used, knocking will occur. Therefore, in this embodiment according to the present invention, in the operating region where homogeneous combustion is performed, a high octane fuel is used. At this time, only combustion by flame propagation is performed.

Figure 10:
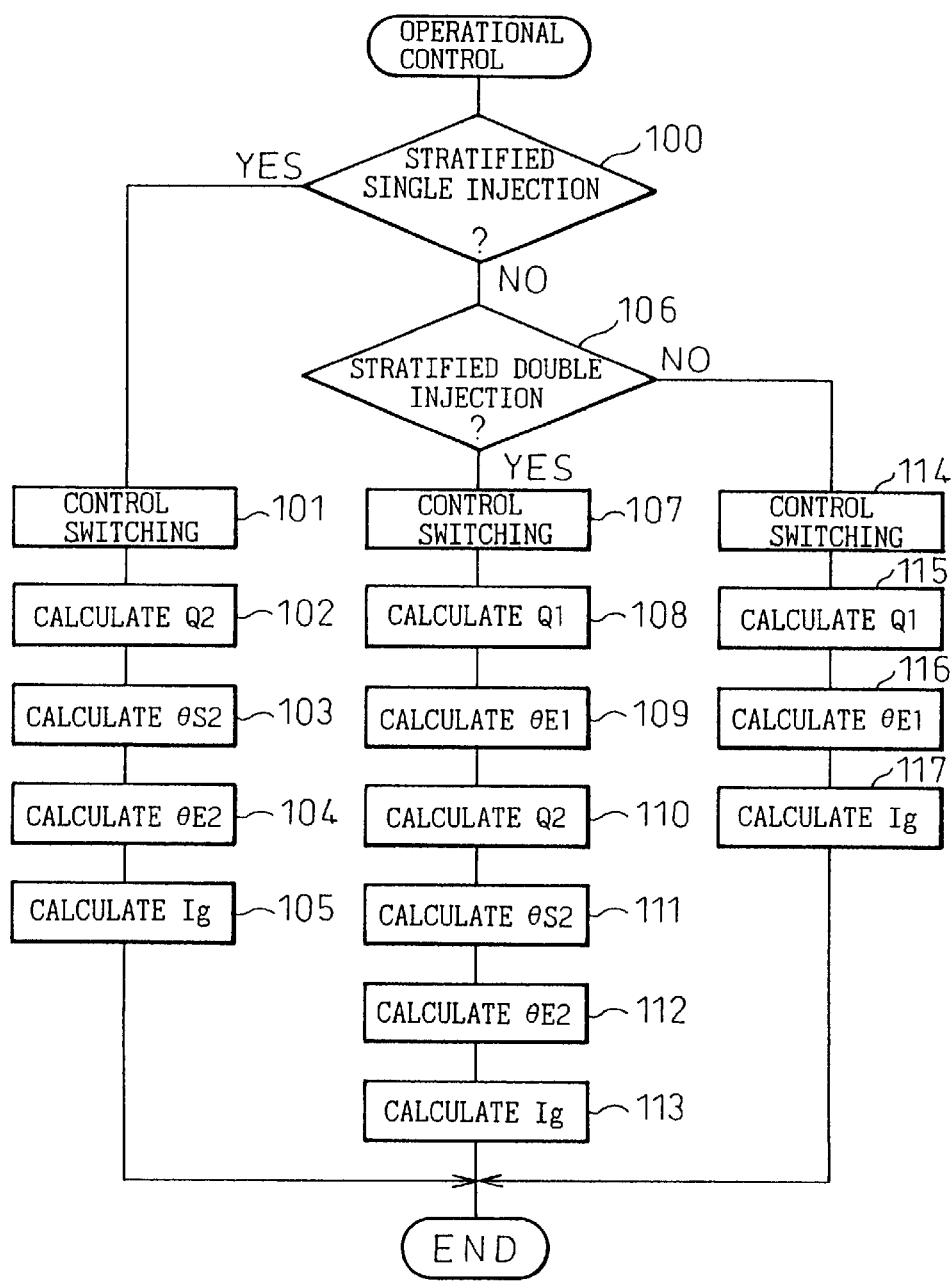
FIG. 10 is a flow chart of operational control.

FIG. 10 shows the routine for operational control of the first embodiment.

Referring to FIG. 10, first, at step 100, it is judged if the operating region is one for stratified charge combustion injecting fuel once at the end period of the compression stroke. When the operating region is one for stratified charge combustion injecting fuel once in the end period of the compression stroke, the routine proceeds to step 101, where the fuel supply control valve 23 is switched so that low octane fuel is supplied to the fuel injector 6. Next, at step 102, the injection amount Q2 is calculated, then at step 103, the injection start timing θS2 is calculated. Next, at step 104, the injection end timing θE2 is calculated based on the injection amount Q2, the injection start timing θS2, and the engine speed N. Next, at step 105, the ignition timing Iq is calculated.

On the other hand, when it is judged at step 100 that the operating region is not one for stratified charge combustion injecting fuel once in the end period of the compression stroke, the routine proceeds to step 106, where it is judged if the operating region is one for stratified charge combustion injecting fuel divided into two at the initial period of the suction stroke and the end period of the compression stroke. When the operating region is one for stratified charge combustion injecting fuel divided into two at the initial period of the suction stroke and the end period of the compression stroke, the routine proceeds to step 107, where the fuel supply control valve 23 is switched so that low octane fuel is supplied to the fuel injector 6.

Next, at step 108, the suction stroke injection amount Q1 is calculated. The injection start timing θS1 of the suction stroke injection is fixed to close to top dead center of the suction stroke as shown in FIG. 3. Therefore, at step 109, the injection end timing θE1 is calculated based on the injection amount Q1, injection start timing θS1, and engine speed N. Next, at step 110, the injection amount Q2 is calculated, then at step 111, the injection start timing θS2 is calculated. Next, at step 112, the injection end timing θE2 is calculated based on the injection amount Q2, the injection start timing θS2, and the engine speed N. Next, at step 113, the ignition timing Iq is calculated.

On the other hand, when it is judged at step 106 that the operating region is not one for stratified charge combustion injecting fuel divided into two at the initial period of the suction stroke and end period of the compression stroke, the routine proceeds to step 114, where the fuel supply control valve 23 is switched so that high octane fuel is supplied to the fuel injector 6. Next, at step 115, the suction stroke injection amount Q1 is calculated. The injection start timing θS1 of the suction stroke injection is fixed to close to top dead center of the suction stroke as shown in FIG. 3. Therefore, at step 116, the injection end timing θE1 is calculated based on the injection amount Q1, injection start timing θS1, and engine speed N. Next, at step 117, the ignition timing Iq is calculated.

Figure 11:
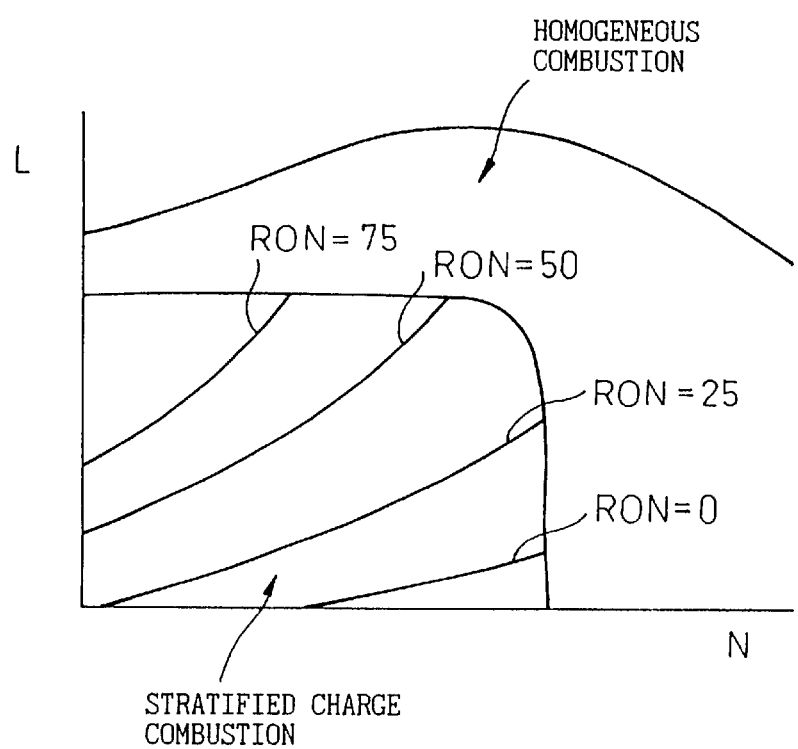
FIG. 11 is a view of operating regions of stratified charge combustion and homogeneous combustion.
Figure 12:
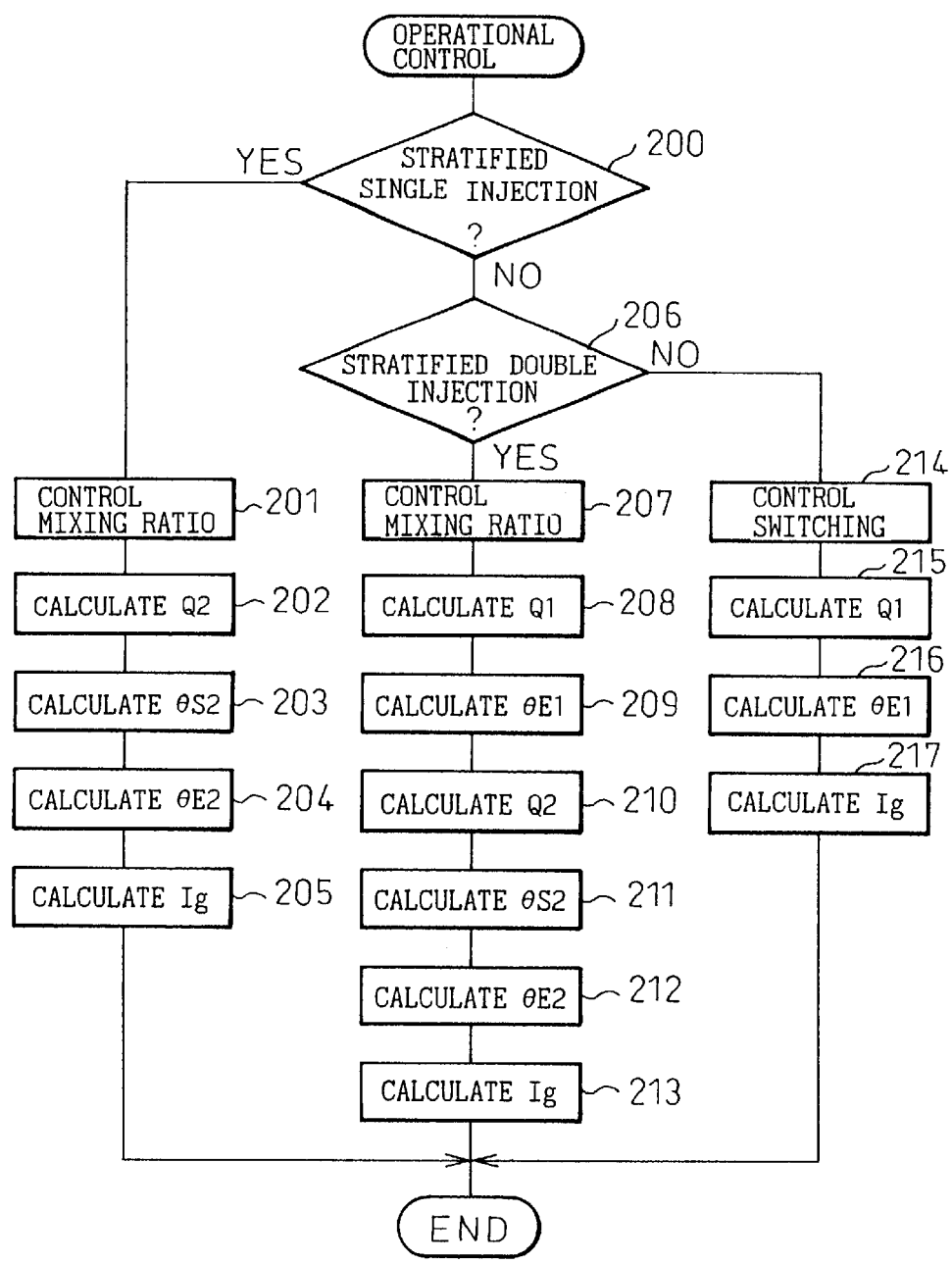
FIG. 12 is a flow chart of operational control.

FIG. 11 and FIG. 12 show a second embodiment. In this embodiment, as shown in FIG. 11, in the operating region where stratified charge combustion is performed, the octane value RON of the low octane fuel is made to change in accordance with the required torque L and the engine speed N. Note that in FIG. 11, the curves of RON=0, RON=25, RON=50, and RON=75 show cases where the octane value is 0, 25, 50, and 75. The octane values between the curves are determined by proportional distribution. Therefore, it is understood, the higher the required torque L, the higher the octane value RON.

Since the higher the required torque L, the higher the temperature in the combustion chamber 5, self-ignition becomes easier and knocking becomes easier to occur. Therefore, in this embodiment, as the required torque L becomes higher, the octane value RON of the low octane fuel is made higher so that knocking will not occur even if the required torque L becomes higher. Note that in this embodiment, the mixing ratio of the low octane fuel and the high octane fuel is controlled by the fuel supply control valve 23 so that the octane value RON of the fuel supplied to the fuel injector 6 is controlled to become the target octane value.

FIG. 12 shows the routine for operational control of the second embodiment.

Referring to FIG. 12, first, at step 200, it is judged if the operating region is one for stratified charge combustion injecting fuel once at the end period of the compression stroke. When the operating region is one for stratified charge combustion injecting fuel once at the end period of the compression stroke, the routine proceeds to step 201, where the mixing ratio of the low octane fuel and the high octane fuel is controlled by the fuel supply control valve 23 so that the octane value RON of the low octane fuel supplied to the fuel injector 6 becomes the target octane value.

Next, at step 202, the injection amount Q2 is calculated, then at step 203, the injection start timing θS2 is calculated. Next, at step 204, the injection end timing θE2 is calculated based on the injection amount Q2, the injection start timing θS2, and the engine speed N. Next, at step 205, the ignition timing Iq is calculated.

On the other hand, when it is judged at step 200 that the operating region is not one for stratified charge combustion injecting fuel once in the end period of the compression stroke, the routine proceeds to step 206, where it is judged if the operating region is one for stratified charge combustion injecting fuel divided into two at the initial period of the suction stroke and the end period of the compression stroke. When the operating region is one for stratified charge combustion injecting fuel divided into two at the initial period of the suction stroke and the end period of the compression stroke, the routine proceeds to step 207, where the mixing ratio of the low octane fuel and the high octane fuel is controlled by the fuel supply control valve 23 so that the octane value RON of the low octane fuel supplied to the fuel injector 6 becomes the target octane value.

Next, at step 208, the suction stroke injection amount Q1 is calculated. The injection start timing θS1 of the suction stroke injection is fixed to close to top dead center of the suction stroke as shown in FIG. 3. Therefore, at step 209, the injection end timing θE1 is calculated based on the injection amount Q1, injection start timing θS1, and engine speed N. Next, at step 210, the injection amount Q2 is calculated, then at step 211, the injection start timing θS2 is calculated. Next, at step 212, the injection end timing θE2 is calculated based on the injection amount Q2, the injection start timing θS2, and the engine speed N. Next, at step 213, the ignition timing Iq is calculated.

On the other hand, when it is judged at step 206 that the operating region is not one for stratified charge combustion injecting fuel divided into two at the initial period of the suction stroke and end period of the compression stroke, the routine proceeds to step 214, where the fuel supply control valve 23 is switched so that high octane fuel is supplied to the fuel injector 6. Next, at step 215, the amount of suction stroke injection Q1 is calculated. The injection start timing θS1 of the suction stroke injection is fixed to close to top dead center of the suction stroke as shown in FIG. 3. Therefore, at step 216, the injection end timing θE1 is calculated based on the injection amount Q1, injection start timing θS1, and engine speed N. Next, at step 217, the ignition timing Iq is calculated.

Figure 13:
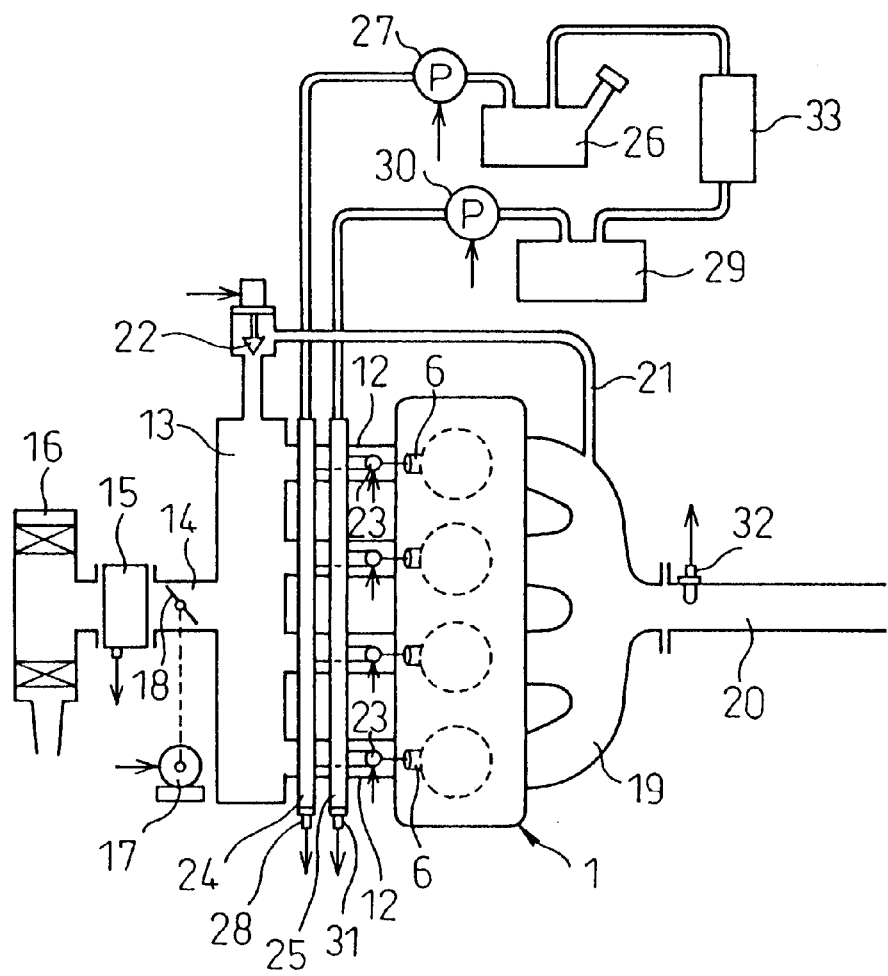
FIG. 13 is an overview of another embodiment of an internal combustion engine.

In the embodiment shown in FIG. 1, however, low octane fuel is stored in the fuel tank 26 in advance and high octane fuel is stored in the fuel tank 29 in advance. In the vehicle, however, it is possible to provide a manufacturing means for manufacturing high octane fuel and low octane fuel from a single fuel, for example, gasoline, light oil, or kerosene. As this manufacturing means, it is possible to use a manufacturing device for manufacturing a low octane fuel from a high octane fuel by reformation, a manufacturing device for manufacturing a high octane fuel from a low octane fuel by reformation, or a manufacturing device for manufacturing a high octane fuel and low octane fuel by distillation. In the third embodiment shown in FIG. 13, a fuel reformation device 33 for reforming low octane fuel in the fuel tank 26 to high octane fuel is provided. The produced high octane fuel is supplied to the fuel tank 29.

Figure 14:
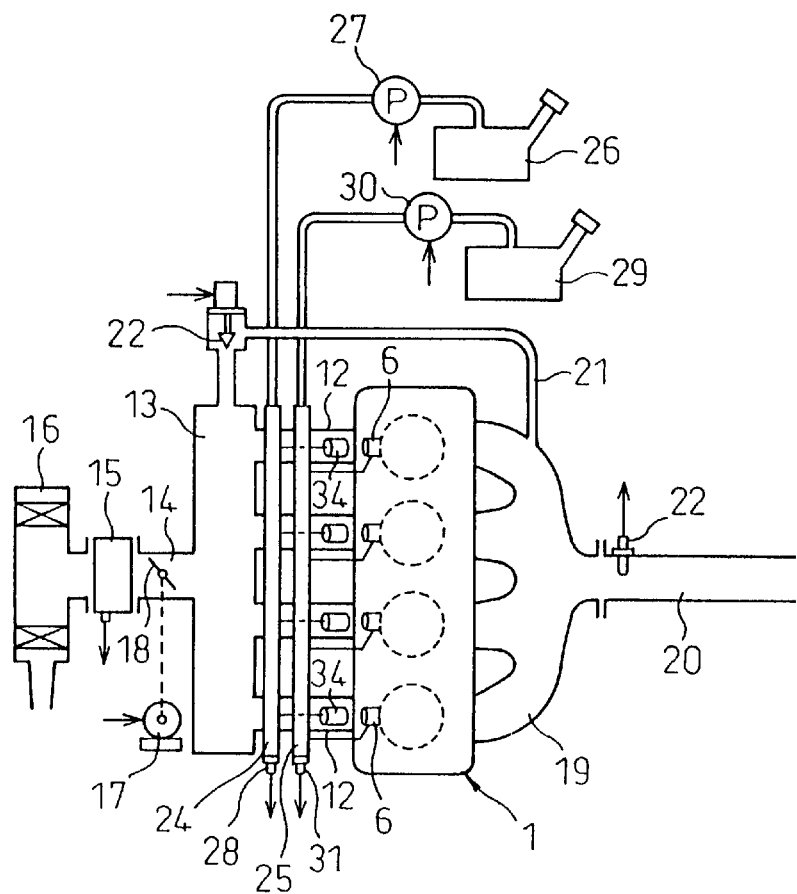
FIG. 14 is an overview of still another embodiment of an internal combustion engine.
Figure 15:
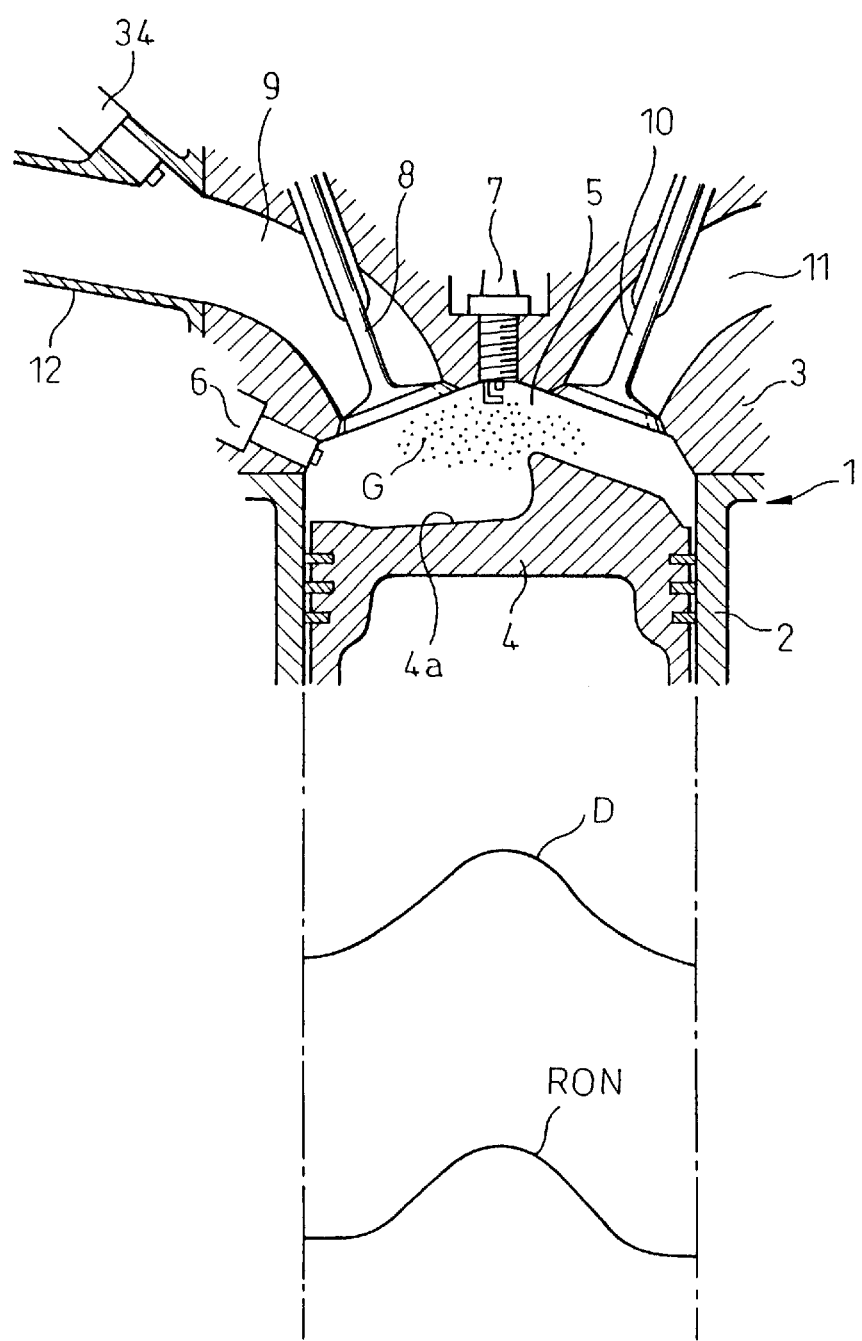
FIG. 15 is a view of a density distribution of a preliminary air-fuel mixture in the combustion chamber.

FIG. 14 to FIG. 18 show a fourth embodiment. As shown in FIG. 14 to FIG. 15, in this embodiment, in addition to the fuel injector 6, a fuel injector 34 for injecting fuel toward the inside of the intake port of the cylinder is arranged at each intake tube 12. The fuel injector 6 is connected to the common rail 25. Therefore, high octane fuel is injected from the fuel injector 6 toward the inside of the combustion chamber 5. On the other hand, the fuel injector 34 is connected to the common rail 34. Therefore, low octane fuel is injected from the fuel injector 34 toward the inside of the intake port 9.

Figure 16:
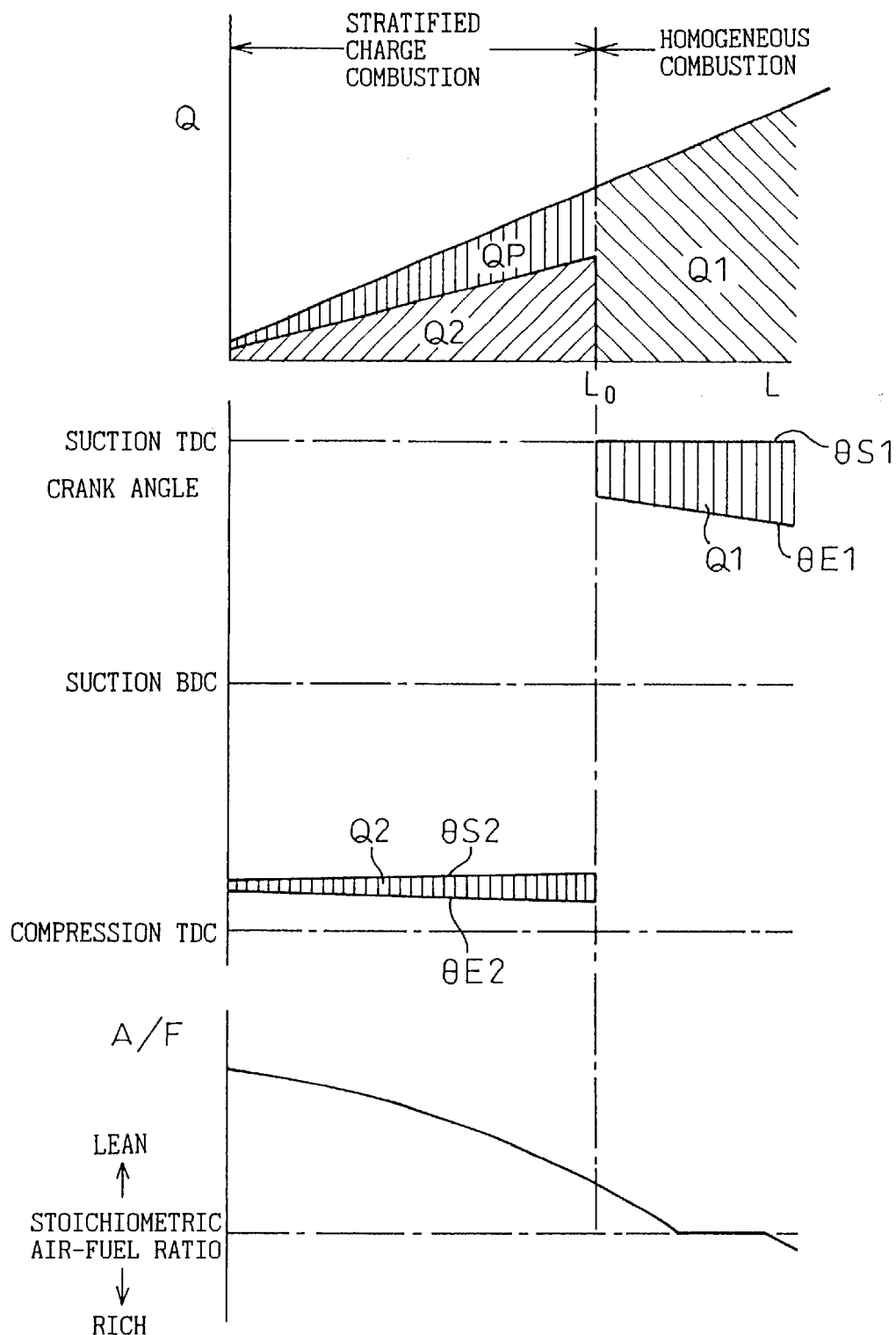
FIG. 16 is a view of an injection amount, injection timing, and air-fuel ratio.
Figure 17:
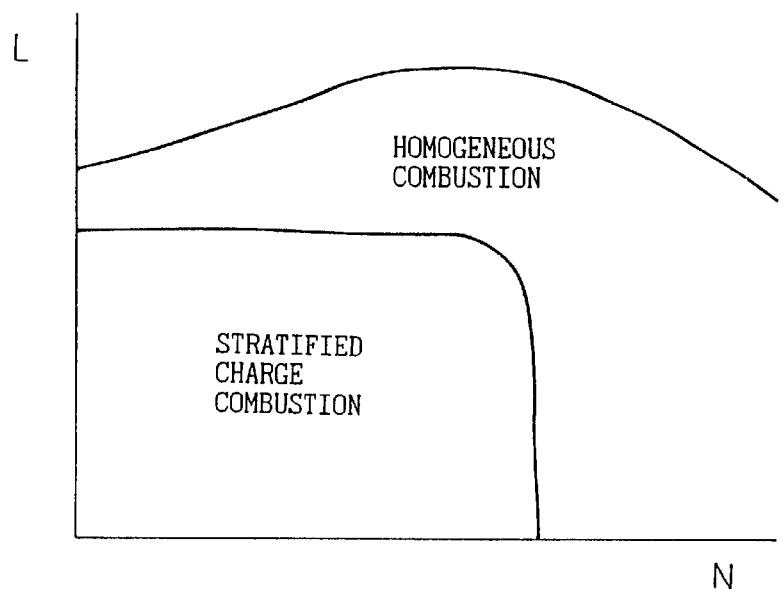
FIG. 17 is a view of operating regions of stratified charge combustion and homogeneous combustion.

As shown in FIG. 16, in this embodiment as well, when the required torque L is lower than $L_0$, stratified charge combustion is performed, while when the required torque L becomes higher than $L_0$, homogeneous combustion is performed. Note that the operating region where stratified charge combustion is performed and the operating region where homogeneous combustion is performed, as shown in FIG. 17, are actually functions of not only the required load L, but also the engine speed N.

As shown in FIG. 16, in the operating region where stratified charge combustion is performed, the low octane fuel is injected from the fuel injector 34 toward the intake port 9 in exactly the injection amount QP and the high octane fuel is injected from the fuel injector 6 toward the combustion chamber 5 at the end period of the compression stroke in exactly the injection amount Q2. Therefore, before the high octane fuel is injected from the fuel injector 6, the inside of the combustion chamber 5 is filled with the homogeneous low octane fuel preliminary air-fuel mixture. When high octane fuel is injected from the fuel injector 6, a preliminary air-fuel mixture G comprised of high octane fuel is formed around the spark plug 7.

Therefore, in this embodiment as well, at the time of stratified charge combustion, the density D of the preliminary air-fuel mixture in the combustion chamber 5 becomes highest at the center of the combustion chamber 5 and gradually falls toward the periphery of the combustion chamber 5 as shown by the curve D in FIG. 15. That is, a spatial distribution occurs in the density D of the preliminary air-fuel mixture. In this case, if a preliminary air-fuel mixture of an equivalence ratio ψ of substantially 1 is formed around the spark plug 7, the equivalence ratio ψ of the preliminary air-fuel mixture gradually becomes smaller toward the periphery of the combustion chamber 5. Note that in this embodiment as well, the equivalence ratio ψ of the preliminary air-fuel mixture around the spark plug 7 need not be 1.

In this embodiment, first, the preliminary air-fuel mixture G comprised of mainly high octane fuel is made to ignite by the spark plug 7 and mainly the high octane fuel is made to burn by flame propagation. If the high octane fuel is made to burn by flame propagation, the pressure and temperature around the low octane fuel around the preliminary air-fuel mixture G rise and therefore the low octane fuel is made to burn by self-ignition.

In this embodiment, however, as explained above, the equivalence ratio ψ of the preliminary air-fuel mixture gradually becomes smaller toward the periphery of the combustion chamber 5. If the equivalence ratio ψ of the preliminary air-fuel mixture gradually becomes smaller in this way, as will be understood from FIGS. 8(A) and (B), the ignition delay time τ will gradually become longer. Therefore, if the preliminary air-fuel mixture self-ignites, next the preliminary air-fuel mixture of its surroundings will self-ignite with a time lag and therefore the preliminary air-fuel mixture will successively self-ignite with a time lag toward the periphery of the combustion chamber 5. If the preliminary air-fuel mixture successively self-ignites with a time lag in this way, the rise in pressure inside the combustion chamber 5 will become gentle, so knocking will become harder to occur.

Further, when high octane fuel and low octane fuel are made to be mixed, the octane value of the mixed fuel becomes an octane value in accordance with the mixing ratio of the high octane fuel and low octane fuel. Therefore, as shown in FIG. 15, since the density of the high octane fuel is high around the spark plug 7, the octane value RON becomes high. Since the density of the high octane fuel becomes lower the further toward the periphery of the combustion chamber 5, the octane value RON gradually becomes smaller. That is, the octane value is low and self-ignition more easily occurs at the periphery of the combustion chamber 5 compared with the center of the combustion chamber 5. In this embodiment, it is possible to control the amount of low octane fuel gathered at the periphery of the combustion chamber 5 by controlling the injection amount QP of the low octane fuel and therefore easily control the self-ignition combustion ratio.

On the other hand, as shown in FIG. 16, in the operating region where homogeneous combustion is performed, high octane fuel is injected from the fuel injector 6 toward the combustion chamber 5 in the initial period of the suction stroke and a homogeneous air-fuel mixture comprised of high octane fuel is burned by flame propagation by the spark plug 7. In this case, a high knock resistance operation is performed by only the high octane fuel.

Figure 18:
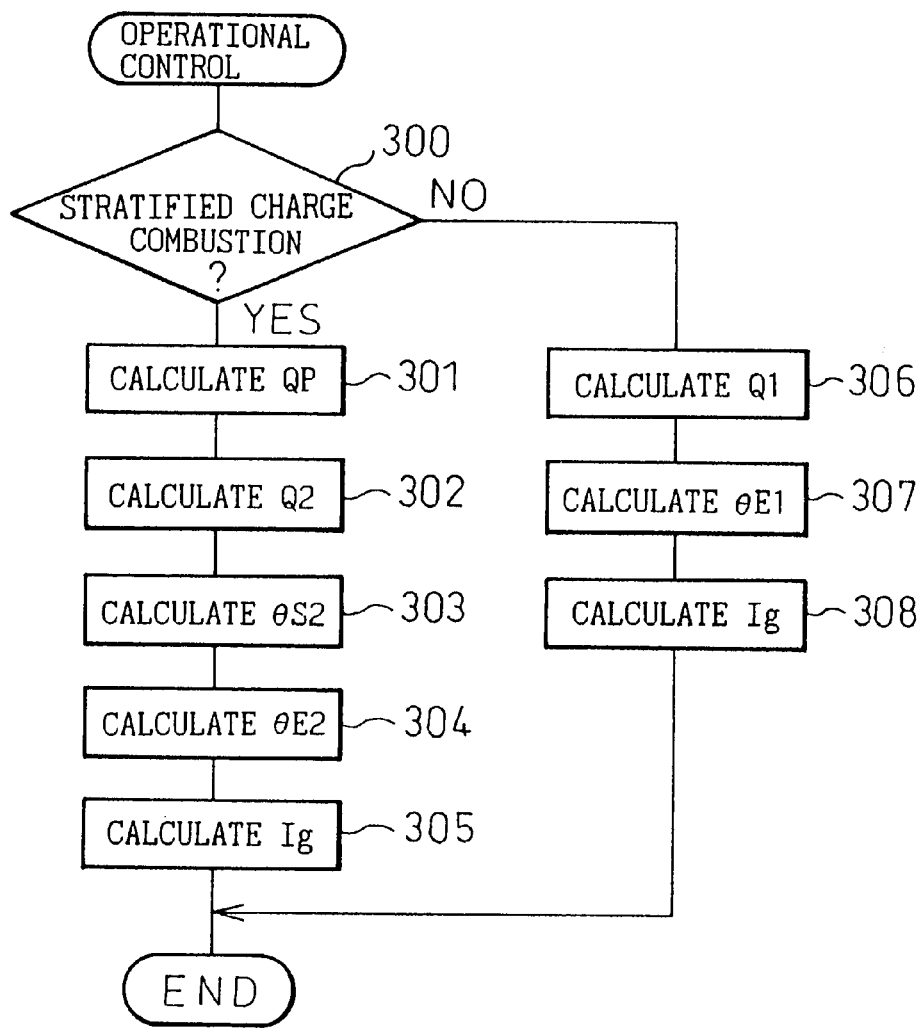
FIG. 18 is a flow chart of operational control.

FIG. 18 shows the routine for operational control of the fourth embodiment.

Referring to FIG. 18, first, at step 300, it is judged if the operating region is one for stratified charge combustion. When the operating region is one for stratified charge combustion, the routine proceeds to step 301, where the injection amount QP of the low octane fuel to be injected from the fuel injector 34 is calculated. Next, at step 302, the injection amount Q2 of the high octane fuel to be injected from the fuel injector 6 is calculated, then at step 303, the injection start timing θS2 of the high octane fuel is calculated. Next, at step 304, the injection end timing θE2 of the high octane fuel is calculated based on the injection amount Q2, the injection start timing θS2, and the engine speed N. Next, at step 305, the ignition timing Iq is calculated.

On the other hand, when it is judged at step 300 that the operating region is not one for stratified charge combustion, the routine proceeds to step 306, where the suction stroke injection amount Q1 of the high octane fuel for injection from the fuel injector 6 is calculated. The injection start timing θS1 of the suction stroke injection is fixed to close to top dead center of the suction stroke as shown in FIG. 16. Therefore, at step 307, the injection end timing θE1 of the high octane fuel is calculated based on the injection amount Q1, injection start timing θS1, and engine speed N. Next, at step 308, the ignition timing Ig is calculated.

Figure 19:
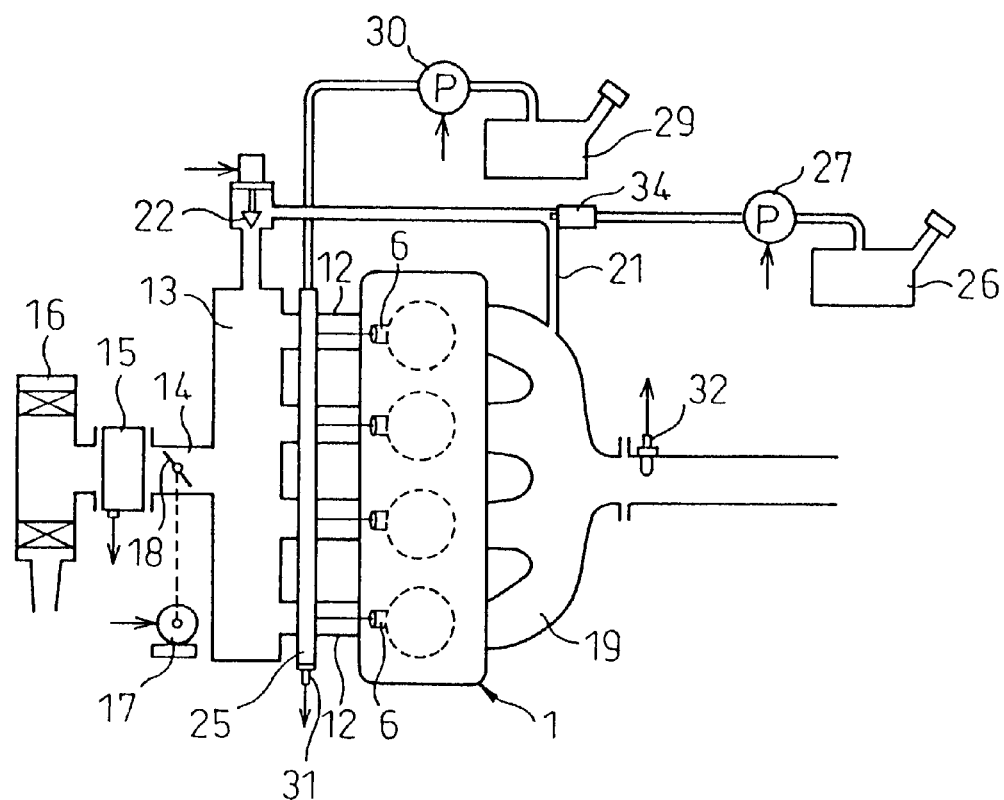
FIG. 19 is an overview of still another embodiment of an internal combustion engine.

FIG. 19 shows a fifth embodiment. In this embodiment, when in the operating state for stratified charge combustion, low octane fuel is injected from the fuel injector 34 toward the inside of the EGR passage 21 so as to promote vaporization of the low octane fuel supplied into the combustion chamber 5 from the intake port 9.

According to the present invention, it is possible to cause part of the preliminary air-fuel mixture to burn by self-ignition and thereby improve the thermal efficiency, reduce the torque fluctuation, and reduce the amount of generation of unburned hydrocarbons.

What is claimed is:

1. A spark ignition type stratified charge combustion internal combustion engine arranging a spark plug in a combustion chamber, said spark ignition type stratified charge combustion internal combustion engine forming by stratification a self-ignitable preliminary air-fuel mixture in the combustion chamber to give a spatial distribution to the density of the preliminary air-fuel mixture in the combustion chamber, igniting part of the preliminary air-fuel mixture formed in the combustion chamber by the spark plug to cause combustion by flame propagation, then successively making the remaining preliminary air-fuel mixture burn by self-ignition with a time lag, and setting the ignition timing so that the ratio of the preliminary air-fuel mixture made to burn by self-ignition becomes more than a predetermined lower limit and less than a knocking generation limit.

2. A spark ignition type stratified charge combustion internal combustion engine as set forth in claim 1, arranging a fuel injector in the combustion chamber and injecting low octane fuel from the fuel injector at least at an end period of a compression stroke to form by stratification a self-ignitable preliminary air-fuel mixture in the combustion chamber and to give a spatial distribution to the density of the preliminary air-fuel mixture in the combustion chamber.

3. A spark ignition type stratified charge combustion internal combustion engine as set forth in claim 1, wherein the lower limit is about 20 percent.

4. A spark ignition type stratified charge combustion internal combustion engine as set forth in claim 1, wherein the preliminary air-fuel mixture does not self-ignite when combustion by flame propagation is not performed and combustion by self-ignition occurs caused by the pressure and temperature rise in the combustion chamber due to combustion by flame propagation when combustion by flame propagation has been performed.

5. A spark ignition type stratified charge combustion internal combustion engine as set forth in claim 1, wherein an octane value of the fuel supplied in the combustion chamber is changed in accordance with an operating state of the engine.

6. A spark ignition type stratified charge combustion internal combustion engine as set forth in claim 5, arranging a fuel injector in the combustion chamber, injecting low octane fuel from the fuel injector at least at an end period of a compression stroke when part of the preliminary air-fuel mixture should be made to burn by self-ignition so as to form by stratification a self-ignitable preliminary air-fuel mixture in the combustion chamber and to give a spatial distribution to the density of the preliminary air-fuel mixture in the combustion chamber, and injecting high octane fuel from the fuel injector when the preliminary air-fuel mixture should not be made to burn by self-ignition.

7. A spark ignition type stratified charge combustion internal combustion engine as set forth in claim 6, forming a homogeneous preliminary air-fuel mixture from high octane fuel supplied from the fuel injector when the preliminary air-fuel mixture should not be burned by self-ignition.

8. A spark ignition type stratified charge combustion internal combustion engine as set forth in claim 6, dividing an operating region of the engine into a low load side operating region and high load side operating region, judging that part of the preliminary air-fuel mixture should be made to burn by self-ignition when the operating state of the engine is the low load side operating region, and judging that the preliminary air-fuel mixture should not be made to burn by self-ignition when the operating state of the engine is the high load side operating region.

9. A spark ignition type stratified charge combustion internal combustion engine as set forth in claim 5, wherein the higher the required torque of the engine, the higher the octane value of the low octane fuel is made.

10. A spark ignition type stratified charge combustion internal combustion engine as set forth in claim 5, changing the ratio of mixture of low octane fuel and high octane fuel to change the octane value of the fuel supplied to the combustion chamber.

11. A spark ignition type stratified charge combustion internal combustion engine as set forth in claim 5, providing a manufacturing means for manufacturing high octane value fuel and low octane value fuel from a single fuel in the vehicle.

12. A spark ignition type stratified charge combustion internal combustion engine as set forth in claim 1, giving a spatial distribution to the octane value of the preliminary air-fuel mixture in the combustion chamber at the same time as giving a spatial distribution to the density of the preliminary air-fuel mixture in the combustion chamber.

13. A spark ignition type stratified charge combustion internal combustion engine as set forth in claim 12, forming a homogeneous preliminary air-fuel mixture comprised of low octane fuel in the combustion chamber and forming a preliminary air-fuel mixture comprised of high octane value around the spark plug in the combustion chamber.

14. A spark ignition type stratified charge combustion internal combustion engine as set forth in claim 13, arranging a first fuel injector in the combustion chamber and providing a second fuel injector for supplying fuel in intake air, injecting low octane fuel from the second fuel injector to form a homogeneous preliminary air-fuel mixture comprised of low octane fuel in the combustion chamber, and forming a preliminary air-fuel mixture comprised of high octane fuel around the spark plug by the high octane fuel injected at the end period of the compression stroke from the first fuel injector.

15. A spark ignition type stratified charge combustion internal combustion engine as set forth in claim 14, providing an exhaust gas recirculation device for recirculating exhaust gas into an intake passage and injecting low octane fuel from the second fuel injector in the exhaust gas to be recirculated.

16. A spark ignition type stratified charge combustion internal combustion engine as set forth in claim 13, forming a homogeneous preliminary air-fuel mixture comprised of low octane fuel and forming a preliminary air-fuel mixture comprised of high octane fuel around the spark plug in the combustion chamber when part of the preliminary air-fuel mixture should be made to burn by self-ignition and forming a preliminary air-fuel mixture comprised of high octane fuel in the combustion chamber when the preliminary air-fuel mixture should not to be made to burn by self-ignition.

17. A spark ignition type stratified charge combustion internal combustion engine as set forth in claim 16, wherein a homogeneous preliminary air-fuel mixture comprised of high octane fuel is formed in the combustion chamber when the preliminary air-fuel mixture should not be burned by self-ignition.

* * * * *